United States Patent [19]
LaBarre

[11] Patent Number: 5,364,201
[45] Date of Patent: Nov. 15, 1994

[54] HINGED STRUT CONSTRUCTION

[75] Inventor: Berger A. LaBarre, Bethel, Conn.

[73] Assignee: Norco, Inc., Ridgefield, Conn.

[21] Appl. No.: 14,535

[22] Filed: Feb. 8, 1993

[51] Int. Cl.$^5$ .................. F16C 11/00; F16B 17/00
[52] U.S. Cl. .................... 403/322; 403/102; 403/327; 403/321; 16/326
[58] Field of Search .......... 403/108, 107, 106, 4, 403/321, 322, 325, 327, 328, 169, 109, 102; 248/351, 188.6, 166; 74/573 R, 587; 16/326; 135/112, 74; 482/27, 28, 17

[56] References Cited

U.S. PATENT DOCUMENTS

| | | | |
|---|---|---|---|
| 646,347 | 3/1900 | Betty | 403/325 |
| 862,762 | 8/1907 | Schliesser | 403/328 |
| 952,871 | 3/1910 | Browder | 482/27 |
| 1,743,241 | 1/1930 | Schmidt | 403/166 |
| 1,805,014 | 5/1931 | Schalk | 403/325 |
| 2,630,730 | 3/1953 | Thornton | 403/83 |
| 3,367,689 | 2/1968 | McCarthy . | |
| 3,390,874 | 7/1968 | McCarthy . | |
| 3,442,541 | 5/1969 | Metz . | |
| 3,469,871 | 9/1969 | Betts . | |
| 3,837,753 | 9/1974 | Weiste et al. | 403/327 |
| 4,014,467 | 3/1977 | Ferguson . | |
| 4,362,415 | 12/1982 | Metz et al. . | |
| 4,366,945 | 1/1983 | Blaustein . | |
| 4,453,449 | 6/1984 | Hollmann . | |
| 4,453,748 | 6/1984 | Ekman | 285/316 |
| 4,546,956 | 10/1985 | Moberg . | |
| 4,682,795 | 7/1987 | Rabushka et al. . | |
| 4,960,344 | 10/1990 | Geisthoff et al. . | |
| 5,066,049 | 11/1991 | Staples . | |
| 5,228,737 | 7/1993 | Zimmerman | 248/351 |

FOREIGN PATENT DOCUMENTS

| | | | |
|---|---|---|---|
| 505019 | 7/1930 | Germany | 248/351 |
| 584040 | 1/1947 | United Kingdom | 248/351 |

Primary Examiner—Randolph A. Reese
Assistant Examiner—Anthony Knight
Attorney, Agent, or Firm—H. Gibner Lehmann; K. Gibner Lehmann

[57] ABSTRACT

A hinged strut construction has a pair of elongate, rigid strut members and a hinge structure connecting adjoining ends of the members to each other. A slide device releasably locks the strut members in an aligned, extended position. The slide device consists of an extendable and retractable locking pin which is axially movable on one strut member and which can be extended into or pulled out of an axial socket of the other member. A collar that is movable on one strut member connects with the locking pin to effect the movement of the pin.

1 Claim, 1 Drawing Sheet

U.S. Patent   Nov. 15, 1994   5,364,201
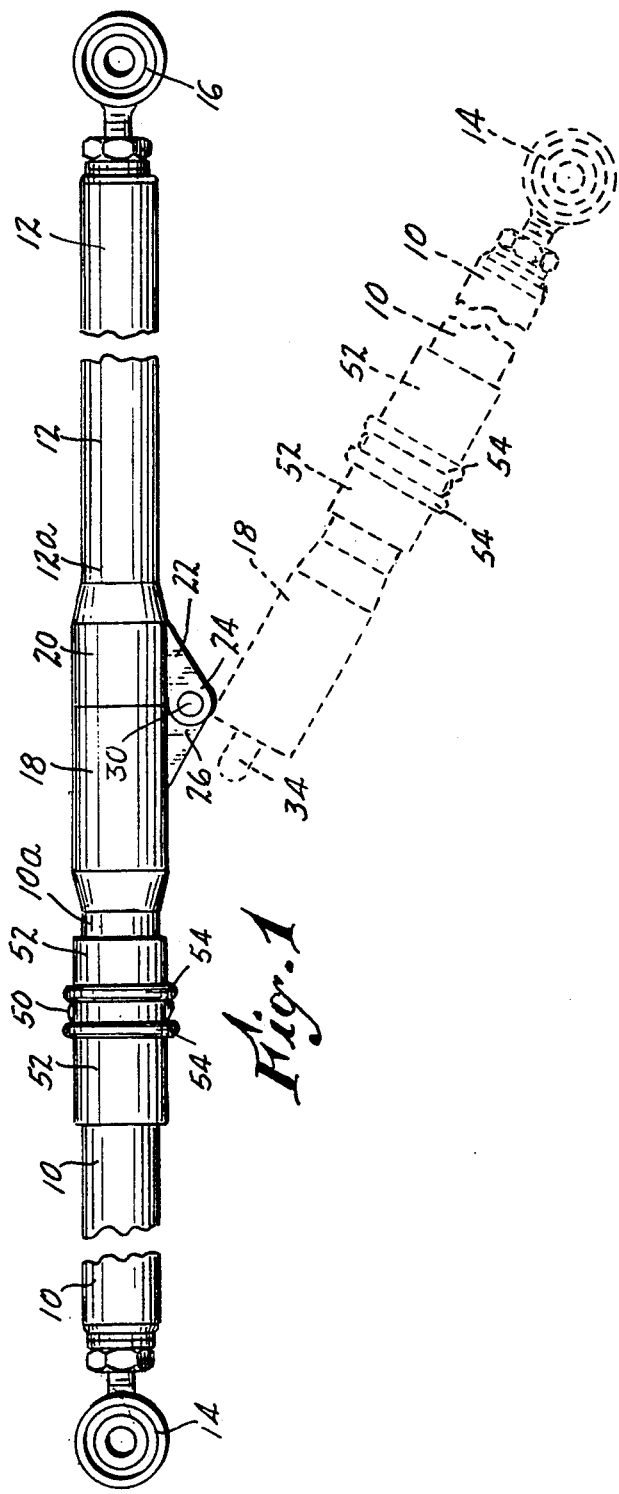
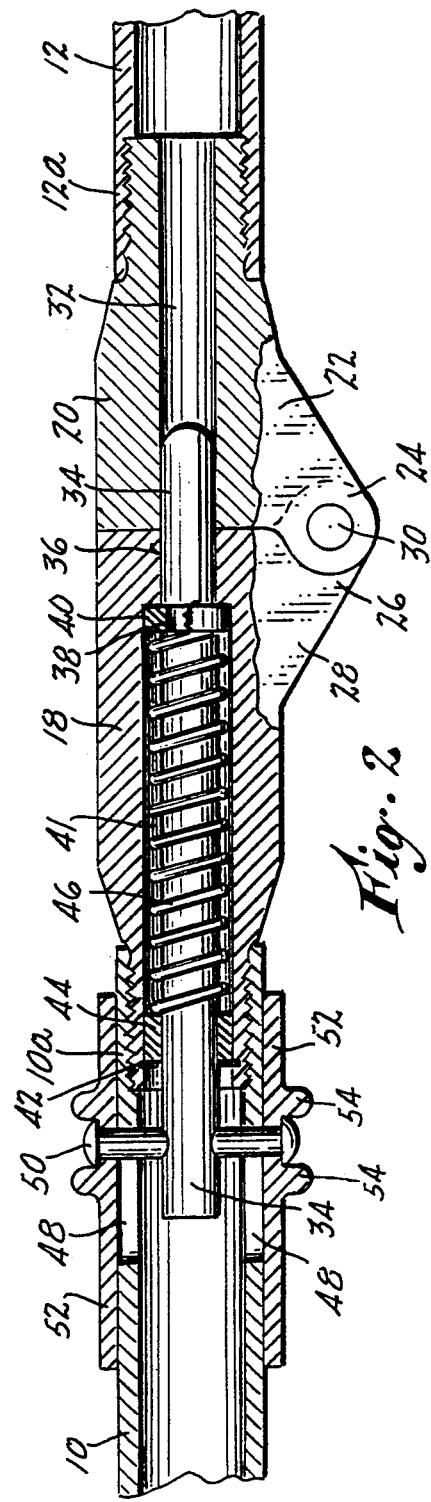

5,364,201

HINGED STRUT CONSTRUCTION

CROSS-REFERENCES TO RELATED APPLICATIONS

Copending application Ser. No. 07/970,016 filed Nov. 2, 1992, now U.S. Pat. No. 5,265,970 dated Nov. 30, 1993, entitled STRUT CONSTRUCTION, and having common ownership with the present application.

STATEMENT AS TO RIGHTS TO INVENTIONS MADE UNDER FEDERALLY-SPONSORED RESEARCH AND DEVELOPMENT.

Research and development of the present invention and application have not been Federally-sponsored, and no rights are given under any Federal program.

BACKGROUND OF THE INVENTION

FIELD OF THE INVENTION

This invention relates to collapsible struts, and more particularly to struts of this type which have hingedly connected members whereby collapse and extension of the strut involves a relative hinging action of the members.

DESCRIPTION OF THE RELATED ART INCLUDING INFORMATION DISCLOSED UNDER 37 CFR §§1.97–1.99

The following prior art references are hereby cited as being of interest.

| | | |
|---|---|---|
| 3,367,689 | 3,390,874 | 3,442,541 |
| 3,469,871 | 4,014,467 | 4,362,415 |
| 4,366,945 | 4,453,449 | 4,453,748 |
| 4,546,956 | 4,682,795 | 4,960,344 |
| 5,066,049 | | |

U.S. Pat. No. 3,442,541, FIG. 1, discloses a releasable fastener in the form of a strut having telescoping inner and outer members, and a locking sleeve which is slidable on the outer member and which controls movement of locking dogs carried respectively in radial slots in the outer member. The inner member has a series of transverse locking ribs which are engaged by corresponding locking ribs on the dogs. With the locking sleeve in its locked position, the dogs are in forcible locking engagement with the ribs on the inner member. When it is desired to release the strut, the sleeve is shifted axially to a position wherein the locking dogs can shift outwardly in response to axial force applied between the telescoping members, and the latter can thereafter collapse into one another, as desired.

U.S. Pat. No. 3,469,871 illustrates a lockable coupling having telescoping inner and outer members and which employs two arcuate locking dogs carried in a circumferential groove of the inner member, and also employs multiple force-transmitting balls housed in radial slots of the inner member. Each arcuate locking dog is engaged by two balls. In operation, a release member or rod having a conical actuator portion engages the balls and shifts them radially, along with the arcuate locking dogs. During locking, the dogs are shifted laterally into inner annular grooves on the outer telescoping member. Locking and release of the telescoping members is accomplished by axially displacing the release member, via a pin-coupled release collar (64, FIG. 2) carried by the inner telescoping member.

Other constructions involving struts of the type employing radially shiftable locking components are illustrated in U.S. Pat. No. 3,390,874 and U.S. Pat. No. 3,367,689.

U.S. Pat. No. 4,362,415 illustrates a locking strut having a slidable locking collar which can be positively retained in a locking position by an external spring-biased locking lever.

Less pertinent is U.S. Pat. No. 4,546,956, which discloses a releasable coupling for a hose attachable to a supply of compressed gas. The arrangement is such that the coupling cannot be removed from the supply fitting until after the pressure is reduced, to minimize danger to personnel from an inadvertent, gas-propelled "fly off" of the coupling.

U.S. Pat. Nos. 4,014,467; 4,366,945; 4,453,748; 4,682,795; and 5,066,049 all involve releasable hose fittings/couplings having various types of locking structures that employ captive balls.

U.S. Pat. No. 4,960,344 discloses a coupling between a drive shaft and a driven shaft. U.S. Pat. No. 4,453,449 relates to a re-useable, non-destructive hold-down apparatus employing locking balls, which apparatus grips a member such as a missle or projectile, until a certain tension is developed by the same, and which thereafter releases the member suddenly.

Many of the devices referred to immediately above are relatively complex structures involving multiple moving parts, and in some cases intricate components of unusual configuration.

In present day manufacturing, cost is always considered an important factor in the success or failure of a particular product. Complexity involves more cost, whereas simplicity in design, coupled with reliability, generally constitutes a distinct advantage to the party producing the product.

Some of the struts heretofore described have sigificant limitations as to size; in many cases, a particular strut has to be customized to a particular application as regards length, leg diameter or size, and leg cross-section. Where it is not possible to effect a complete collapse of the strut, storage and shipping problems become a major concern. The inability to adapt a particular strut to slightly differing size or structural installations thus constitutes a distinct drawback, which jeopardizes the overall usefulness of the device.

In cases where multiple structural components make up a strut, there is a greater likelihood of jamming or inadvertent failure of the strut under harsh operating environments. Ease of use from the standpoint of the customer (i.e. the party who ultimately operates the strut in its intended application) is also a consideration which must be taken into account.

SUMMARY OF THE INVENTION

The above disadvantages and drawbacks of prior locking strut constructions are largely obviated by the present invention, which has for one object the provision of a locking strut which is both extremely simple in its structure, and rugged and reliable over extended periods of use.

Yet another object of the invention is to provide an improved strut as above characterized, wherein locking can be accomplished by merely shifting the two legs or members of the strut into axial alignment with one another following which a release collar automatically shifts, under spring bias, to its locking position wherein the strut members are thereafter retained in their locking positions.

A still further object of the invention is to provide an improved strut of the kind indicated, wherein little or no maintenance or servicing is required over the life of the strut.

Still another object of the invention is to provide an improved strut as above set forth, wherein substitution of strut members having different lengths, cross sections, and/or diameters (sizes) can be readily accomplished without re-design of the strut, thereby lending the strut to applications having different physical dimensions and strength requirements. In addition, the feature of substitutability as noted enables strut members of different materials to be employed, such as aluminum, steel, or stainless steel, depending on the nature of the environment in which the strut is to be employed.

Yet another object of the invention is to provide an improved strut in accordance with the foregoing, wherein the opposite ends of the strut can be provided with different coupler configurations, either single- or double-ended. For example, the strut can be provided with a "quick disconnect" coupler at either or both ends, if desired. Conventional couplers having bearings can alternately be supplied.

A still further object of the invention is to provide an improved strut as above described, which can be readily released and folded back upon itself. This is significant not only from the standpoint of the ability to provide a very small "collapsed" length in use, but in addition, shipping and storage of the strut is facilitated.

Another object of the invention is to provide an improved strut as above set forth, wherein high compressive strength is realizeable, approaching that of a rigid, straight rod.

A still further object of the invention is to provide an improved strut as outlined above, wherein there are substantially eliminated problems with over-rotation (past center, or past axial alignment) of the strut members during locking. Such problems could make locking difficult, especially where relatively large loads were intended to be supported or carried.

Yet another object of the invention is to provide an improved strut as outlined above, wherein the strut components can be readily fabricated and assembled, so as to keep the manufacturing costs as low as possible.

A still further object of the invention is to provide an improved strut of the kind employing a spring-biased locking slide collar, wherein the collar spring is not under high load when the strut is in storage and disposed in its collapsed or folded-back state.

Finally, the disclosed strut can be employed to control almost any type of door, panel, gate, or other movable member, and is seen to offer a highly desirable alternative to air/hydraulic units, or telescoping-type units, thereby providing a cost-effective approach to dealing with applications requiring strut-type retaining structures.

In accomplishing the above objects the invention provides a hinged strut construction comprising, in combination a pair of elongate, rigid strut members, hinge means hingedly connecting adjoining ends of the strut members to each other to enable the members to be either aligned or else angularly disposed with respect to each other, and slide means for releasably locking the strut members in an aligned position, the latter comprising an extendable and retractable locking pin axially movable on one member and an axially extending socket on the other member, adapted to receive the locking pin.

The arrangement is such that the during locking of the strut, the pin retracts against its spring bias during engagement with the end wall of the other strut adjacent the bore, sufficiently to avoid interference between the pin and the other strut, and thereafter snaps into the bore after the members are aligned. This snapping is accomplished automatically when the members are moved toward their aligned positions, and no manual forces are required to be applied to the locking slide means.

An especially simple and strong structure as applied against compressive loads is thereby realized; the compressive force sustainable is not substantially different from that of a rigid rod of similar physical configuration.

Manufacturing economy is also realizeable, with the disclosed construction.

Other features and advantages will hereinafter appear.

BRIEF DESCRIPTION OF THE DRAWINGS

FIG. 1 is a side elevational view of a hinged strut construction made in accordance with the invention, having a dotted-line showing of a folded position of one of the strut members, and FIG. 2 is a fragmentary axial sectional view of the central locking portions of the strut, in the extended, locking position.

DESCRIPTION OF THE PREFERRED EMBODIMENT

Referring first to FIG. 1, the improved strut of the invention comprises a pair of elongate, rigid strut members 10 and 12, constituted preferably as metal tubes. At the remote ends of the strut the members 10 and 12 have pivotal connector fittings 14 and 16 of usual construction, attached to the members by threaded shanks with lock nuts as illustrated.

In accordance with the invention, the near ends 10a and 12a of the members 10 and 12 are hingedly connected to each other by a unique, especially simple pivot or hinge structure that has few parts, is strong and sturdy particularly in compression, economical to fabricate and easy to operate. In carrying this out, and considering now FIG. 2, the strut members 10 and 12 at their near ends have mating end fittings 18 and 20 respectively, screwed into the threaded end portions 10a and 12a of the strut members to securely anchor the fittings thereto.

The end fitting 18 carried by the strut member 10 is shown as being of the male type, whereas the fitting 20 carried by the strut member 12 is shown as being of the female type. The fitting 20 has a bifurcated hinge portion 22 comprising two apertured spaced-apart ears 24 between which there is received a single apertured ear 26 of a hinge portion 28 of the end fitting 18. A round-nosed pivot pin 30 passing through the ears 24 and 26 hingedly connects the fittings 18 and 20 to each other, in turn thereby hingedly connecting the strut members 10 and 12 together.

Further, in accordance with the invention, the fitting 20 is provided with an axial bore 32 of substantial diameter, and the fitting 18 has an axially movable locking pin 34 which is slidably receivable in the axial bore 32. The pin 34 is of substantial length, as will be observed, and can be fabricated of strong and tough metal, as for instance steel which is suitably hardened and annealed. For the positions of the parts shown in FIG. 2, the strut members 10 and 12 will be locked to each other against relative angular movement by virtue of the disposition of the pin 34 in the bore 32 of the end fitting 20 in conjunction with the coaction of the pivotally connected ears 24 and 26.

Means are provided for stoutly supporting the locking pin 34 in the end fitting 18 for advancing and retracting movements, and for easily manually shifting the locking pin between the extremes of such movements. For this purpose, the fitting 18 has an axial bore 36 which snugly slidably fits the pin 34, and the latter carries in an annular groove 38 thereof a captive combined bearing and stop ring 40. Also, the fitting 18 has an enlarged bore 41 in which there is an annular internal groove that has a spring washer 42, such washer engaging a bearing ring 44 that is carried by the locking pin 34. Between the bearing rings 40 and 44 and in the bore 41 a compression spring 46 is disposed, carried by the locking pin 34. The spring 46 biases the rings 40 and 44 apart, and also maintains the locking pin 34 in an advanced or protruding position as shown in the figures.

For the purpose of enabling a manual actuation of the pin 34 to be effected, the end portion 10a of the strut member 10 is provided with a pair of diametrically opposite axially extending slots 48 through which a cross pin 50 passes, such pin also extending through a release collar 52 and being headed over as shown to retain it in place. The release collar 52 is axially movable on the portion 10a of the strut member 10, thereby to enable motion to be transmitted to the locking pin 34 to retract the same against the action of the compression spring 46. The release collar 52 has a pair of annular beads 54 to provide an easy finger grip for actuating it.

When the pin 34 is sufficiently retracted it becomes withdrawn from the bore 32 of the fitting 20, thereby unlocking the strut members 10 and 12 and enabling them to be relatively angularly shifted, as depicted by the dotted line showing of FIG. 1.

From the above it can be seen that I have provided a novel and improved strut construction which is both simple in its structure and easy to use. The strut can be locked by merely swinging the members to the relative positions of FIG. 2, in axial alignment with one another, without any manual force being needed on the release collar 52. The abutting ends of the fittings 18, 20 tend to maintain the alignment under compressive load, and the fact that these abutting ends lie perpendicular to the axes of the members 10, 12 substantially eliminates any transverse loads between ears 24 and 26 and pin 30, as well as eliminating transverse load on the pin 34 in a direction which might tend to shear it. The resultant strut thus has a strength under compressive load, which is not much different from that of a straight tubular or rod-like member of similar size. Increases in compressive load act in such a way as to stiffen the strut even more, as by counteracting any side load on the joint comprising ears 24, 26 and pin 30.

The tubes 10 and 12 can be tailored as to size, length, cross-sectional configuration and material, in order to suit different applications, thereby rendering the construction more nearly universal than would be the case with fixed or welded components. Added flexibility is also realized by the provision of the removable end couplings 14 and 16, as noted earlier in the specification.

The disclosed strut construction is thus seen to represent a distinct advance and improvement in this field.

Variations and modifications are possible without departing from the spirit of the invention.

Each and every one of the appended claims defines an aspect of the invention which is separate and distinct from all others, and accordingly it is intended that each claim be treated in this manner when examined in the light of the prior art devices in any determination of novelty or validity.

What is claimed is:

1. A hinged strut construction comprising, in combination:
   a) a pair of elongate, rigid strut members,
   b) hinge means hingedly connecting adjoining ends of the strut members to each other to enable the members to be either aligned or else angularly disposed with respect to each other,
   c) slide means for releasably locking the strut members in an aligned position, comprising an extendable and retractable locking pin axially movable on one member and an axially extending socket on said other member, adapted to receive said locking pin,
   d) said slide means comprising a manually engageable release collar axially movable on the said one strut member, and means for operatively connecting said release collar to the said locking pin,
   e) said one strut member having a tubular end,
   f) an end fitting being carried in said tubular end of the strut member,
   g) said release collar being slidably carried on and surrounding said tubular end,
   h) said locking pin being movable and held captive in said end fitting,
   i) said axially movable locking pin having an annular groove,
   j) said end fitting having an annular internal groove,
   k) washers disposed in said annular grooves, and
   l) a compression spring located between the said washers and disposed on the axially movable locking pin.

* * * * *